United States Patent
Zhang et al.

(10) Patent No.: US 12,118,096 B2
(45) Date of Patent: Oct. 15, 2024

(54) IMAGE ENCRYPTION METHOD BASED ON MULTI-SCALE COMPRESSED SENSING AND MARKOV MODEL

(71) Applicant: DALIAN UNIVERSITY OF TECHNOLOGY, Dalian (CN)

(72) Inventors: Qiang Zhang, Dalian (CN); Bin Wang, Dalian (CN); Pengfei Wang, Dalian (CN); Yuandi Shi, Dalian (CN); Rongrong Chen, Dalian (CN); Xiaopeng Wei, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 268 days.

(21) Appl. No.: 17/948,648

(22) Filed: Sep. 20, 2022

(65) Prior Publication Data
US 2023/0092977 A1    Mar. 23, 2023

Related U.S. Application Data (63) Continuation of application No. PCT/CN2022/097275, filed on Jun. 7, 2022.

(30) Foreign Application Priority Data

Sep. 18, 2021 (CN) .......................... 202111111707.6

(51) Int. Cl.
G06F 17/16 (2006.01)
G06F 21/60 (2013.01)
G06N 7/01 (2023.01)

(52) U.S. Cl.
CPC ............ *G06F 21/602* (2013.01); *G06F 17/16* (2013.01); *G06N 7/01* (2023.01)

(58) Field of Classification Search
CPC ........ G06N 10/11; G06N 10/20; G06N 10/60; G06N 7/80; G06N 7/01; G06N 7/02;
(Continued)

(56) References Cited

U.S. PATENT DOCUMENTS 5,260,968 A * 11/1993 Gardner ................. H01Q 3/242
375/347
12,048,549 B1 * 7/2024 Li ......................... G06V 10/764
(Continued)

FOREIGN PATENT DOCUMENTS

| CN | 104699606 A | 6/2015 |
| CN | 104751495 A | 7/2015 |

(Continued)

*Primary Examiner* — Khanh Q Dinh
(74) *Attorney, Agent, or Firm* — Nitin Kaushik (57) ABSTRACT

The present disclosure discloses an image encryption method based on multi-scale compressed sensing and a Markov model. According to the difference in information carried by low-frequency coefficients and high-frequency coefficients of an image, different sampling rates are set for the low-frequency coefficients and the high-frequency coefficients of the image, which can effectively improve the reconstruction quality of a decrypted image. The decrypted image obtained by the present disclosure has higher quality than the decrypted image generated by the existing scheme, and a better visual effect and more complete original image information can be obtained.

8 Claims, 2 Drawing Sheets

1:target sampling rate    2:plaintext image
3:generating an initial key and parameters    4:external key
5:subsampling rates of coefficient matrices at all levels
6:three-level wavelet transform
7:a chaotic system iteratively generates chaotic sequences
8: independent diffusion    9:global diffusion    10:encrypted image
11:coefficient matrix blocking    12:control parameters
13: image matrix row vector scrambling    15: index vector
14:coefficient matrix interior scrambling    16:index value
17:adjusting matrix dimensions    18: mage matrix row vector scrambling
19:measurement    20:measurement matrix
21:second round of coefficient matrix merging
22:constructing a Markov state transition matrix
23:first round of coefficient matrix merging    26:quantization
24:calculating a row-probability transition matrix and setting flag bits
25calculating a column-probability transition matrix and setting flag bits (58) Field of Classification Search
CPC ........ G06N 7/046; G06N 20/00; G06N 20/10; G06F 21/602; G06F 17/16
USPC .......................... 709/220, 224, 226, 227, 228
See application file for complete search history.

(56) References Cited

U.S. PATENT DOCUMENTS

| | | | |
|---|---|---|---|
| 2007/0018109 A1* | 1/2007 | Wang | G01T 1/295 |
| | | | 250/363.09 |
| 2008/0316491 A1* | 12/2008 | Franzen | G01N 21/55 |
| | | | 356/445 |
| 2024/0160420 A1* | 5/2024 | Martinez Canedo | G06F 8/33 |
| 2024/0168437 A1* | 5/2024 | Lei | B42D 25/328 |
| 2024/0177246 A1* | 5/2024 | Jackson | G06F 16/2365 |
| 2024/0187260 A1* | 6/2024 | Krahn | H04L 9/0894 |
| 2024/0205031 A1* | 6/2024 | Thongsom | G06F 16/182 |

FOREIGN PATENT DOCUMENTS

| | | | | |
|---|---|---|---|---|
| CN | 105488426 A | | 4/2016 | |
| CN | 108235029 A | * | 6/2018 | ......... H04N 1/32272 |
| CN | 114338023 A | | 4/2022 | |
| CN | 110148078 B | * | 9/2022 | ........... G06T 1/0057 |

* cited by examiner

FIG. 1

FIG. 2

IMAGE ENCRYPTION METHOD BASED ON MULTI-SCALE COMPRESSED SENSING AND MARKOV MODEL

CROSS-REFERENCE TO RELATED APPLICATIONS

This application claims the priority of Chinese Patent Application Serial No. 202111111707.6, filed with the State Intellectual Property Office of P. R. China on Sep. 18, 2021, named "Image Encryption Method Based on Multi-scale Compressed Sensing and Markov Model", the entire contents of which are incorporated herein by reference.

TECHNICAL FIELD

The present disclosure relates to the technical field of image encryption, in particular to an image encryption method based on multi-scale compressed sensing and a Markov model.

BACKGROUND

With the continuous development of social productivity and Internet technologies, digital image information, as an important carrier of Internet information, plays a very important role in the interaction of Internet information. In many fields involving personal privacy, commercial secrets, national defense secrets, national security and so on, the security requirements of digital image information are getting higher and higher, so digital image encryption technologies are becoming more and more important. At present, the commonly used digital image encryption technologies are relatively mature, but most of theoretical cores thereof are still mainly put forward by foreign countries. Throughout existing image encryption schemes, there are some weaknesses, such as easy access to the relevant information of original images, poor plaintext sensitivity and key sensitivity, poor reconstruction quality of decrypted images and poor encryption effects. Therefore, it is very urgent and necessary to comprehensively improve and innovatively provide a more perfect and safer digital image encryption method.

SUMMARY

In view of the above-mentioned shortcomings of prior art, the present disclosure provides an image encryption method based on multi-scale compressed sensing and a Markov model, which expands the application range of compressed sensing theory in the field of image encryption; a new pixel scrambling method is designed with the help of the Markov model; and finally encrypted images with better encryption effects and decrypted images with better decryption effects are obtained.

In order to achieve the above objective, the present disclosure adopts the following technical solution:

The image encryption method based on multi-scale compressed sensing and the Markov model includes:
  generating parameters and initial values of one-dimensional chaotic mapping according to plaintext image information;
  obtaining subsampling rates of original coefficient matrices at all levels by using multi-scale block compressed sensing theory through a total target sampling rate of a plaintext image;
  substituting the parameters and initial values of the one-dimensional chaotic mapping into a corresponding chaotic system to generate chaotic sequences, transforming the chaotic sequences into a matrix form, and obtaining corresponding orthogonal basis matrices, and extracting some elements of the orthogonal basis matrices as measurement matrices according to the subsampling rates;
  performing three-level discrete wavelet transform on the plaintext image to obtain the original coefficient matrices at all levels, and blocking the original coefficient matrices at all levels to construct new coefficient matrixes at all levels;
  using the chaotic sequences to generate index sequences, and scrambling the corresponding coefficient matrices at all levels as blocks;
  using the measurement matrices to measure the coefficient matrices at all levels;
  retaining low-frequency coefficient matrices, merging measured non-low frequency coefficient matrices at all levels to construct a matrix T, performing micro-processing on the matrix T to obtain a to-be-measured matrix NT, and respectively generating a row-state transition probability matrix and a column-state transition probability matrix according to the to-be-measured matrix NT;
  performing SVD decomposition on the low-frequency coefficient matrices to obtain submatrices, and quantizing the elements in the submatrices and the non-low frequency coefficient matrices at all levels to a preset interval;
  generating index values according to the information of the chaotic sequences and determining merging rules by the index values, firstly mering the non-low frequency coefficient matrices at all levels according to the merging rules to obtain an overall matrix, and then inserting the submatrices into different positions of the overall matrix;
  adjusting the dimension of the overall matrix, acquiring the element information of the overall matrix, and generating control parameters for secondary scrambling;
  scrambling the merged overall matrix according to the row-state transition probability matrix and the column-state transition probability matrix, and simultaneously setting corresponding flag bits; and
  performing independent diffusion of elements on the overall matrix by using one of the chaotic sequences, and performing global diffusion on elements of the overall matrix by using the other chaotic sequences to obtain a final encrypted image.

Further, a specific method of generating parameters and initial values of one-dimensional chaotic mapping according to plaintext image information is as follows:
  a SHA256 function is used for generating a hash value K of the plaintext image, and after K is transformed into a binary number, 32 sets of binary numbers $k_1$, $k_2 \ldots , k_{32}$ are generated in groups of 8 bit;

$$r_0 = \begin{cases} r_{end} - \dfrac{\mod\left(\left(\dfrac{l_0}{L_0}+\dfrac{l_1}{L_1}\right) \times r_{end} \times 10, 1\right)}{10}, \left(\dfrac{l_0}{L_0}+\dfrac{l_1}{L_1}\right) \times r_{end} \times 10 > r_{end} \\ \left(\dfrac{l_0}{L_0}+\dfrac{l_1}{L_1}\right) \times r_{end} \times 10, \left(\dfrac{l_0}{L_0}+\dfrac{l_1}{L_1}\right) \times r_{end} \times 10 \le r_{end} \end{cases}$$

where, $L_0$ and $L_1$ are the numbers of 0 and 1 in a hash value K of the plaintext image respectively, $l_0$ and $l_1$ are a length of a longest continuous 0 sequence and a length of a longest continuous 1 sequence respectively, $r_{end}$ is a right endpoint of a chaotic interval, and $r_0$ is a certain value of the chaotic interval;

$$\begin{cases} r_1 = r_{start} + \mathrm{mod}\left(\left(\frac{(\max(k_1, k_2, k_3, k_4, k_5, k_6) \times t_1)}{(\min(k_1, k_2, k_3, k_4, k_5, k_6) \times t_2)}\right) \times 10^{14}, r_{end} - r_{start}\right) \\ r_2 = r_{start} + \mathrm{mod}\left(\left(\frac{(\max(k_7, k_8, k_9, k_{10}, k_{11}, k_{12}) \times t_3)}{(\min(k_7, k_8, k_9, k_{10}, k_{11}, k_{12}) \times t_4)}\right) \times 10^{14}, r_{end} - r_{start}\right) \end{cases}$$

where, $k_i$, i=1, 2, ..., 12 is the i-th binary number of K, $t_1$-$t_4$ is an external key, $r_{start}$ is a left endpoint of the chaotic interval, $r_{end}$ is the right endpoint of the chaotic interval, $r_1$ and $r_2$ are some values of the chaotic interval;

$$\begin{cases} a = \dfrac{r_{end}}{\left(1 + e^{\frac{1}{256} \times (-t_5 \times (k_{13} \oplus k_{14} \oplus k_{15}))}\right)} \\ b = \dfrac{r_{end}}{\left(1 + e^{\frac{1}{256} \times (-t_6 \times (k_{16} \oplus k_{17} \oplus k_{18}))}\right)} \\ c = \dfrac{1}{2} \times \left(\dfrac{r_{start}}{\left(1 + e^{\frac{1}{256} \times (-t_7 \times (k_{19} \oplus k_{20} \oplus k_{21}))}\right)} + \dfrac{r_{end}}{\left(1 + e^{\frac{1}{256} \times (-t_8 \times (k_{22} \oplus k_{23} \oplus k_{24}))}\right)}\right) \end{cases}$$

where, $k_i$, i=13, 14, ..., 24 is the i-th binary number of K, $t_5$-$t_8$ is an external key, $r_{start}$ is the left endpoint of the chaotic interval, $r_{end}$ is the right endpoint of the chaotic interval, and a, b and c are some values of the chaotic interval;

$$\begin{cases} Z_1 = \begin{bmatrix} t_1 \times k_{25} & t_3 \times k_{26} \\ t_5 \times k_{27} & t_7 \times k_{28} \end{bmatrix} \\ Z_2 = \begin{bmatrix} t_5 \times k_{29} & t_4 \times k_{30} \\ t_6 \times k_{31} & t_8 \times k_{32} \end{bmatrix} \end{cases}$$

where, $k_i$, i=25, 14, ..., 32 is the i-th binary number of K, $t_1$-$t_8$ is an external key, and $Z_1$ and $Z_2$ are transition matrices;

$$\begin{cases} x_0 = \mathrm{mod}((Z_3(1) + Z_3(2) - \lfloor Z_3(1) + Z_3(2) \rfloor) \times 10^{14}, 1) \\ x_{00} = \mathrm{mod}((Z_3(3) + Z_3(4) - \lfloor Z_3(3) + Z_3(4) \rfloor) \times 10^{14}, 1) \\ y_{00} = \mathrm{mod}((Z_3(1) + Z_3(3) - \lfloor Z_3(1) + Z_3(3) \rfloor) \times 10^{14}, 1) \\ v_0 = \mathrm{mod}((Z_3(2) + Z_3(4) - \lfloor Z_3(2) + Z_3(4) \rfloor) \times 10^{14}, 1) \end{cases}$$

where, $\lfloor \cdot \rfloor$ presents downward rounding, $Z_3$ is a Kronecker product of transition $Z_1$ and transition $Z_2$, $Z_3(i)$, 1=1, 2, 3, 4 represents the i-th element of the matrix $Z_3$, and $x_0$, $x_{00}$, $y_{00}$, $v_0$ are the initial values of the corresponding chaotic mapping, respectively.

Further, a specific method of scrambling the corresponding coefficient matrices at all levels as the blocks comprises:
letting a matrix $A_3$ be an m×n matrix, expanding the matrix $A_3$ into a sequence with a length being m×n, wherein i is the index of the i-th element in the sequence, a scrambling method of which is as follows:

$A_3'(Ind_3(m \times n - i + 1)) = A_3(Ind_3(i))$ where, $A_3'$ is a sequence after $A_3$ is scrambled, and $Ind_3$ is an index sequence for scrambling third-level wavelet decomposition coefficient matrices; and similarly, other coefficient matrices $H_i'$, $V_i'$, $D_i'$, i=1, 2, 3 after scrambling are obtained.

Further, a specific method of performing micro-processing on the matrix T to obtain the to-be-measured matrix NT is as follows:

$$T = \begin{pmatrix} H_1'' & V_1'' & D_1'' \\ H_2'' & V_2'' & D_2'' \\ H_3'' & V_3'' & D_3'' \end{pmatrix}$$

where, $H_i''$, $V_i''$, $D_i''$, i=1, 2, 3 are coefficient matrices after $H_i'$, $V_i'$, $D_i'$, i=1, 2, 3 are compressed, and T is a coefficient merging matrix;

$$\begin{cases} NT = -T, l_0 > l_1 \\ NT = T - 0.5, L_0 > L_1 \\ NT = T + 0.5, L_0 < L_1 \end{cases}$$

where, $L_0$ and $L_1$ are the numbers of 0 and 1 in the hash value K of the plaintext image respectively, $l_0$ and $l_1$ are the length of the longest continuous 0 sequence and the length of the longest continuous 1 sequence respectively, and NT is the to-be-measured matrix after processing T.

Further, a specific method of firstly mering the non-low frequency coefficient matrices at all levels according to the merging rules to obtain the overall matrix is as follows:

$$\begin{cases} Lind_1 = (X_1'(n_1 \times n_1) + X_2'(n_2 \times n_2) + X_3'(n_3 \times n_3))/3 \\ Lind_1 = \mathrm{floor}\left(\mathrm{mod}(\mathrm{abs}(Lind_1) \times 10^8, 6)\right) + 1 \\ Lind_2 = (X_1'(n_1 \times n_1 - 1) + X_2'(n_2 \times n_2 - 1) + X_3'(n_3 \times n_3 - 1))/3 \\ Lind_2 = \mathrm{floor}\left(\mathrm{mod}(\mathrm{abs}(Lind_2) \times 10^8, 6)\right) + 1 \\ Lind_3 = (X_1'(n_1 \times n_1 - 1) + X_2'(n_2 \times n_2 - 1) + X_3'(n_3 \times n_3 - 1))/3 \\ Lind_3 = \mathrm{floor}\left(\mathrm{mod}(\mathrm{abs}(Lind_3) \times 10^8, 6)\right) + 1 \end{cases}$$

where, $Lind_i$, i=1, 2, 3 is an index value generated by the chaotic sequence $X_i'$, i=1, 2, 3, $n_i \times n_i$, i=1, 2, 3 is a length of $X_i'$, i=1, 2, 3, and $Lind_i'$, i=1, 2, 3 is a result of mapping $Lind_i$, i=1, 2, 3 to an interval [1, 6];

$$\begin{cases} \begin{pmatrix} Y_{11} \\ Y_{12} \\ Y_{13} \end{pmatrix} = \begin{pmatrix} H_3''' \\ H_2''' \\ H_1''' \end{pmatrix}, \begin{pmatrix} Y_{21} \\ Y_{22} \\ Y_{23} \end{pmatrix} = \begin{pmatrix} V_3''' \\ V_2''' \\ V_1''' \end{pmatrix}, \begin{pmatrix} Y_{31} \\ Y_{32} \\ Y_{33} \end{pmatrix} = \begin{pmatrix} D_3''' \\ D_2''' \\ D_1''' \end{pmatrix} \\ \begin{pmatrix} Y_{11} \\ Y_{12} \\ Y_{13} \end{pmatrix} = \begin{pmatrix} H_3''' \\ H_1''' \\ H_2''' \end{pmatrix}, \begin{pmatrix} Y_{21} \\ Y_{22} \\ Y_{23} \end{pmatrix} = \begin{pmatrix} V_3''' \\ V_1''' \\ V_2''' \end{pmatrix}, \begin{pmatrix} Y_{31} \\ Y_{32} \\ Y_{33} \end{pmatrix} = \begin{pmatrix} D_3''' \\ D_1''' \\ D_2''' \end{pmatrix} \\ \begin{pmatrix} Y_{11} \\ Y_{12} \\ Y_{13} \end{pmatrix} = \begin{pmatrix} H_2''' \\ H_3''' \\ H_1''' \end{pmatrix}, \begin{pmatrix} Y_{21} \\ Y_{22} \\ Y_{23} \end{pmatrix} = \begin{pmatrix} V_2''' \\ V_3''' \\ V_1''' \end{pmatrix}, \begin{pmatrix} Y_{31} \\ Y_{32} \\ Y_{33} \end{pmatrix} = \begin{pmatrix} D_2''' \\ D_3''' \\ D_1''' \end{pmatrix} \\ \begin{pmatrix} Y_{11} \\ Y_{12} \\ Y_{13} \end{pmatrix} = \begin{pmatrix} H_2''' \\ H_1''' \\ H_3''' \end{pmatrix}, \begin{pmatrix} Y_{21} \\ Y_{22} \\ Y_{23} \end{pmatrix} = \begin{pmatrix} V_2''' \\ V_1''' \\ V_3''' \end{pmatrix}, \begin{pmatrix} Y_{31} \\ Y_{32} \\ Y_{33} \end{pmatrix} = \begin{pmatrix} D_2''' \\ D_1''' \\ D_3''' \end{pmatrix} \\ \begin{pmatrix} Y_{11} \\ Y_{12} \\ Y_{13} \end{pmatrix} = \begin{pmatrix} H_1''' \\ H_3''' \\ H_2''' \end{pmatrix}, \begin{pmatrix} Y_{21} \\ Y_{22} \\ Y_{23} \end{pmatrix} = \begin{pmatrix} V_1''' \\ V_3''' \\ V_2''' \end{pmatrix}, \begin{pmatrix} Y_{31} \\ Y_{32} \\ Y_{33} \end{pmatrix} = \begin{pmatrix} D_1''' \\ D_3''' \\ D_2''' \end{pmatrix} \\ \begin{pmatrix} Y_{11} \\ Y_{12} \\ Y_{13} \end{pmatrix} = \begin{pmatrix} H_1''' \\ H_2''' \\ H_3''' \end{pmatrix}, \begin{pmatrix} Y_{21} \\ Y_{22} \\ Y_{23} \end{pmatrix} = \begin{pmatrix} V_1''' \\ V_2''' \\ V_3''' \end{pmatrix}, \begin{pmatrix} Y_{31} \\ Y_{32} \\ Y_{33} \end{pmatrix} = \begin{pmatrix} D_1''' \\ D_2''' \\ D_3''' \end{pmatrix} \end{cases}$$

where, $H_i'''$, $V_i'''$, $D_i'''$, i=1, 2, 3 is a result of quantizing $H_i''$, $V_i''$, $D_i''$, i=1, 2, 3 to [0, 255], a first group of sorted matrices are marked as $Y_1$, three internal block matrices are marked as $Y_{11}$, $Y_{12}$, $Y_{13}$ respectively, and a sorting order is determined by $Lind_1'$; a second group of sorted matrices are marked as $Y_2$, three internal block matrices are marked as $Y_{21}$, $Y_{22}$, $Y_{23}$, and a sorting order is determined by $Lind_2'$; and a third group of sorted matrices are marked as $Y_3$, three internal block matrices are marked as $Y_{31}$, $Y_{32}$, $Y_{33}$, and a sorting order is determined by $Lind_3'$ D.

Further, a specific method of inserting the submatrices into different positions of the overall matrix is as follows:

$$\begin{cases} Hind_1 = (X_1'(1) + X_2'(1) + X_3'(1))/3 \\ Hind_2 = (X_1'(2) + X_2'(2) + X_3'(2))/3 \\ Hind_3 = (X_1'(3) + X_2'(3) + X_3'(3))/3 \\ Hind_1' = \text{floor}\left(\text{mod}\left(\text{abs}(Hind_1) \times 10^8, 4\right)\right) + 1 \\ Hind_2' = \text{floor}\left(\text{mod}\left(\text{abs}(Hind_2) \times 10^8, 4\right)\right) + 1 \\ Hind_3' = \text{floor}\left(\text{mod}\left(\text{abs}(Hind_3) \times 10^8, 4\right)\right) + 1 \end{cases}$$

where, $Hind_i$, i=1, 2, 3 is an index value generated by the chaotic sequence $X_i'$, i=1, 2, 3, and $Hind_i'$, i=1, 2, 3 is a result of mapping $Hind_i$, i=1, 2, 3 to the interval [1, 4];

$$\begin{cases} Y_1' = \begin{pmatrix} U \\ Y_{11} \\ Y_{12} \\ Y_{13} \end{pmatrix}, Y_2' = \begin{pmatrix} S \\ Y_{21} \\ Y_{22} \\ Y_{23} \end{pmatrix}, Y_3' = \begin{pmatrix} VT \\ Y_{31} \\ Y_{32} \\ Y_{33} \end{pmatrix} \\ Y_1' = \begin{pmatrix} Y_{11} \\ U \\ Y_{12} \\ Y_{13} \end{pmatrix}, Y_2' = \begin{pmatrix} Y_{21} \\ S \\ Y_{22} \\ Y_{23} \end{pmatrix}, Y_3' = \begin{pmatrix} Y_{31} \\ VT \\ Y_{32} \\ Y_{33} \end{pmatrix} \\ Y_1' = \begin{pmatrix} Y_{11} \\ Y_{12} \\ U \\ Y_{13} \end{pmatrix}, Y_2' = \begin{pmatrix} Y_{21} \\ Y_{22} \\ S \\ Y_{23} \end{pmatrix}, Y_3' = \begin{pmatrix} Y_{31} \\ Y_{32} \\ VT \\ Y_{33} \end{pmatrix} \\ Y_1' = \begin{pmatrix} Y_{11} \\ Y_{12} \\ Y_{13} \\ U \end{pmatrix}, Y_2' = \begin{pmatrix} Y_{21} \\ Y_{22} \\ Y_{23} \\ S \end{pmatrix}, Y_3' = \begin{pmatrix} Y_{31} \\ Y_{32} \\ Y_{33} \\ VT \end{pmatrix} \end{cases}$$

$$T' = (Y_1' \ Y_2' \ Y_3')$$

where, $Y_1'$ is a matrix after the first group merging, and the sorting order is determined by $Hind_1'$; $Y_2'$ is a matrix after the second group merging, and the sorting order is determined by $Hind_2'$; $Y_3'$ is a matrix after the third group merging, and the sorting order is determined by $Hind_3'$; T' is a matrix after $Y_1'$, $Y_2'$ and $Y_3'$ are merged; and U, S and VT are three submatrices obtained by SVD decomposition of the low-frequency coefficient matrices at levels.

Further, a specific method of adjusting the dimension of the overall matrix and acquiring the element information of the overall matrix is as follows:

$$\begin{cases} \text{Max} = \max(T') \\ \text{Min} = \min(T') \\ d_1 = \text{floor}(\text{mean}(T')) \\ d_2 = \text{ceil}((\text{Max} + \text{Min})/2) \\ d_1' = \text{mod}(d_1, 10) \\ d_2' = \text{mod}(d_2, 10) \\ d_{12} = \max(d_1', d_2') \end{cases}$$

where, Max is the maximum value of the matrix T', Min is the minimum value of the T', $d_1$ is the maximum integer less than or equal to the average value of elements in the T', $d_2$ is the minimum integer greater than or equal to the average value of Max and Min, $d_1'$ is the remainder of $d_1$ divided by 10, $d_2'$ is the remainder of $d_2$ divided by 10, and $d_{12}$ is the larger of d1' and d2'.

Further, a specific method of generating the control parameters for secondary scrambling is as follows:

$$\begin{cases} V_1 = 10 \times V' - \text{round}(10 \times V') \\ V_2 = 10^2 \times V' - \text{round}(10^2 \times V') \\ V_3 = 10^3 \times V' - \text{round}(10^3 \times V') \\ V_4 = 10^4 \times V' - \text{round}(10^4 \times V') \end{cases}$$

where, V' is a generated and processed chaotic sequence, and $V_i$, i=1, 2, 3, 4 is a subsequence generated by V';

$$\begin{cases} w_1 = \text{fix}(\text{mod}(V_1(m_1' + n_1') + 1, 5)) \\ w_2 = \text{fix}(\text{mod}(V_2 (\text{round}(m_1'/2 + n_1'/2) + 2) \times 10^2, 5^2)) \\ w_3 = \text{fix}(\text{mod}(V_3(\text{abs}(\text{round}((m_1'/3 - n_1'/3) + 3))) \times 10^3, 5^3)) \\ w_4 = \text{fix}(\text{mod}(V_4(\text{abs}(\text{round}(m_1'/4 - n_1'/4) + 4)) \times 10^4, 5^4)) \end{cases}$$

where, $w_1$-$w_4$ are used as control parameters for subsequent shift operation, and fix is a rounding function to zero; and $m_1'$ is a maximum prime factor of a matrix row dimension $m_1$, and $n_1'$ is a maximum prime factor of a matrix column dimension $n_1$.

The encrypted image obtained by the present disclosure has higher information entropy than the encrypted image generated by the existing scheme, it is difficult to obtain the relevant information of an original image, and at the same time, the encrypted image obtained by the present disclosure has better plaintext sensitivity and key sensitivity, and can resist various attacks. The decrypted image obtained by the present disclosure has higher quality than the decrypted image generated by the existing scheme, and a better visual effect and more complete original image information can be obtained.

Compared with the existing methods, the present disclosure has the following advantages:

1. The concept of a transition probability matrix in the Markov model is introduced to scramble the image, the state space is defined according to the characteristics of image pixel values in the encryption process, and a state transition probability matrix is constructed according to the distribution of pixel values, so that the encryption process has relatively good randomness, which is difficult to predict.

2. The information of plaintext images and chaotic sequences is used in the whole encryption process, which makes the encryption scheme have better plaintext sensitivity and can effectively resist and select plaintext attacks and known plaintext attacks.

3. The multi-scale block compressed sensing theory is introduced to set the sampling rate of the image more reasonably, which greatly improves the reconstruction quality of the decrypted image.

DETAILED DESCRIPTION OF THE EMBODIMENTS

Firstly, an image is subjected to wavelet decomposition to obtain original coefficient matrices at all levels, secondly, the coefficient matrices at all levels are scrambled once, then the corresponding coefficient matrices are measured by multiple measurement matrices respectively, afterwards, the merged measurement matrices are scrambled twice by means of a state transition probability matrix, and finally the final encrypted image is obtained by diffusion. The decryption process is the reverse process of the encryption process.

There are four chaotic mapping used in the present disclosure, which are respectively TSL mapping, TLT mapping, Hybrid mapping and ISEL mapping.

(2) if the integer part of a number is both negative and odd, the number is a negative odd number.

(3) if the integer part of a number is both positive and even, the number is a positive even number.

(4) if the integer part of a number is both negative and even, the number is a negative even number.

Then, initializing a 4×4 matrix f which is used for recording the frequency number of state transition. For each column of vectors of a to-be-measured matrix, firstly determining which category of number a first element belongs to, that is, determining row coordinates of the state transition matrix. Then determining which category of number the next element belongs to, that is, determining column coordinates of the state transition matrix. The numerical value of the position in the matrix f corresponding to a coordinate point is plus 1. By analogy, the updated matrix f is obtained, which is as shown in Table 1, the sum of each row of the above matrix f is calculated, and each element in a row is divided by the sum of the corresponding row to obtain a corresponding probability. After all probabilities are calculated, a final row-state transition probability matrix is obtained, which is as shown in Table 2. A generation method of a column-state transition probability matrix is similar to that of the row-state transition probability matrix, except that row vectors are taken each time instead of column vectors of the to-be-measured matrix.

TABLE 1

|  | Positive odd number | Negative odd number | Positive even number | Negative even number |
|---|---|---|---|---|
| Positive odd number | 3696 | 3796 | 4249 | 3289 |
| Negative odd number | 3833 | 3928 | 4409 | 3449 |
| Positive even number | 4217 | 4471 | 4937 | 3733 |
| Negative even number | 3284 | 3424 | 3763 | 2962 |

TABLE 2

|  | Positive odd number | Negative odd number | Positive even number | Negative even number |
|---|---|---|---|---|
| Positive odd number | 0.2459 | 0.2526 | 0.2827 | 0.2188 |
| Negative odd number | 0.2454 | 0.2515 | 0.2823 | 0.2208 |
| Positive even number | 0.2429 | 0.2576 | 0.2844 | 0.2151 |
| Negative even number | 0.2445 | 0.2549 | 0.2801 | 0.2205 |

The TSL mapping, TLT mapping, and Hybrid mapping are used for constructing measurement matrices, index sequences for first scrambling, and index values of coefficient matrix merging rules. The ISEL mapping is used for generating control parameters for second scrambling, and diffusion sequences for independent diffusion and global diffusion.

A construction method of the state transition probability matrix used in the present disclosure comprises:

firstly, constructing state space, and dividing numbers into four categories, which are defined as follows:

(1) if the integer part of a number is both positive and odd, the number is a positive odd number.

A method of scrambling pixels based on the state transition probability matrix used in the present disclosure is as follows:

for the row-state transition probability matrix (the column-state transition probability matrix), finding the position of a value with a probability value greater than 0.25 in the matrix. Row coordinates indicate the selection of odd/even column (row) vectors and the moving direction up/down (left/right). If the row coordinates are odd numbers, the odd column (row) is selected, and if the row coordinates are even numbers, the even column (row) is selected; and if the row coordinates are positive numbers, the selected element are moved up (left), and if the row coordinates are negative numbers, the selected element are moved down (right). Specifically, if the row of the selected number corresponds to a positive odd number, all odd columns (rows) of the matrix are moved up (left); if the row of the selected number corresponds to a negative odd number, all odd columns (rows) of the matrix are moved down (right); if the row of the selected number corresponds to a positive even number, all even number columns (rows) of the matrix are moved up (left); and if the row of the selected number corresponds to a negative even number, all even number columns (rows) of the matrix are moved down (right). The column coordinates indicate the shift number of cyclic shifts, and specific values are generated by chaotic mapping.

Embodiment 1

Figure 1:
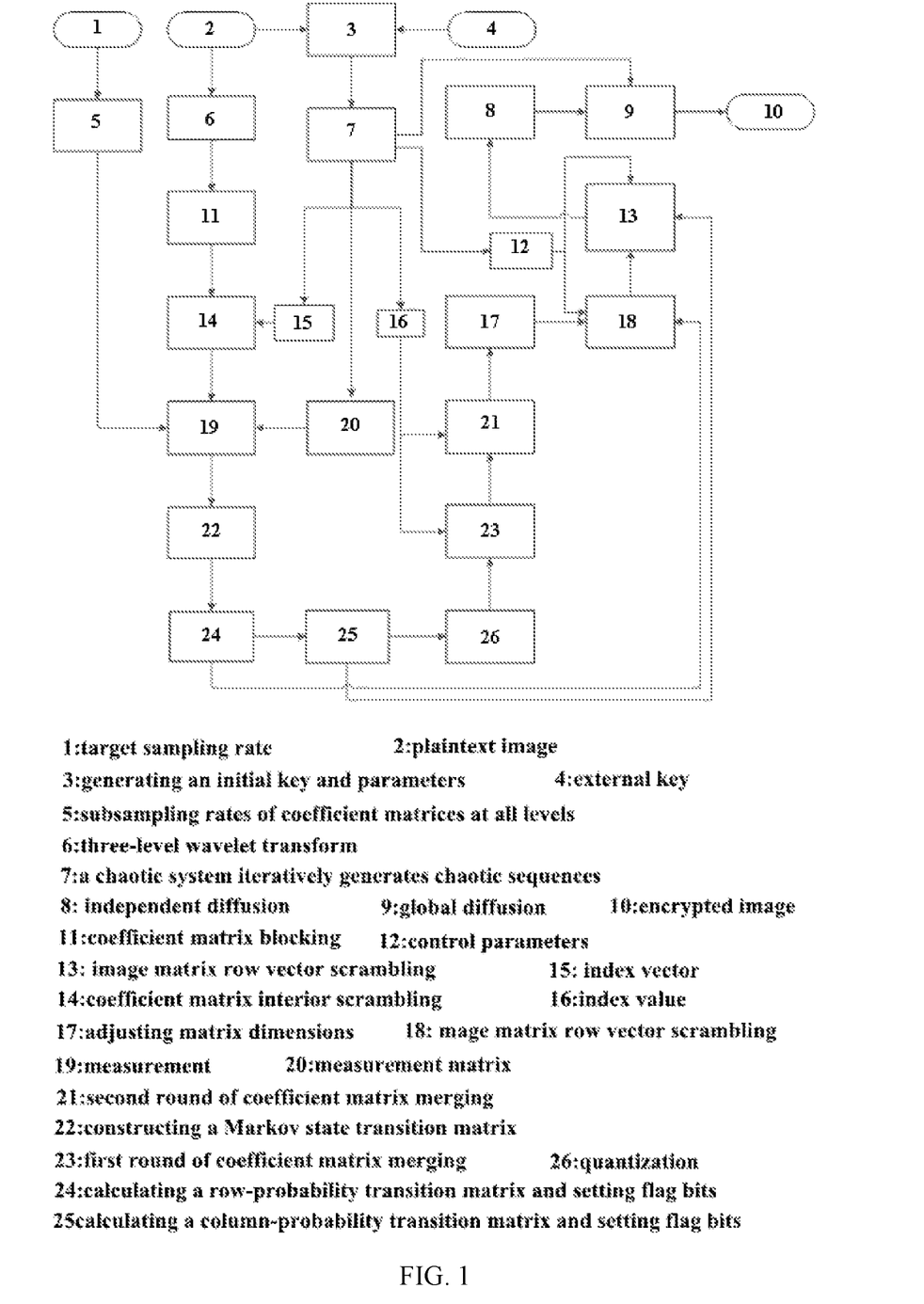
FIG. 1 is a frame diagram of an encryption process of the present disclosure.

As shown in FIG. 1, the embodiments of the present disclosure are implemented based on the technical solution of the present disclosure. Detailed implementation and specific operating processes are given, but the scope of protection of the present disclosure is not limited to the following embodiments. An external key set in the embodiment can be: $t_1=0.11$, $t_2=0.22$, $t_3=0.33$, $t_4=0.44$, $t_5=2.723$, $t_6=0.618$, $t_7=3.141$, $t_8=4.6692$, $t=600$, the array block_size that determines the block size of the matrix is set to [32, 16, 8], that is, $block\_size_1=32$, $block\_size_2=16$, $block\_size_3=8$, and the sampling rate is set to 0.25. The chaotic mapping is as described above.

Step 1. generating parameters and initial values of one-dimensional chaotic mapping according to plaintext image information.

For example, a SHA256 function is used for generating a hash value K of the plaintext image, and after K is transformed into a binary number, 32 sets of binary numbers $k_1$, $k_2 \ldots$, $k_{32}$ are generated in groups of 8 bits. The number $L_0$ of 0 and the number $L_1$ of 1 in the hash value K of the plaintext, the length $l_0$ of the longest continuous 0 sequence and the length $l_1$ of the longest continuous 1 sequence are calculated. The parameters and initial values of one-dimensional chaotic mapping are generated according to the following formula.

$$r_0 = \begin{cases} 4 - \dfrac{\mathrm{mod}\left(\left(\dfrac{l_0}{L_0}+\dfrac{l_1}{L_1}\right)\times 40, 1\right)}{10}, & \left(\dfrac{l_0}{L_0}+\dfrac{l_1}{L_1}\right)\times 40 > 4 \\ \left(\dfrac{l_0}{L_0}+\dfrac{l_1}{L_1}\right)\times 40, & \left(\dfrac{l_0}{L_0}+\dfrac{l_1}{L_1}\right)\times 40 \leq 4 \end{cases}$$

$$\begin{cases} r_1 = 1.05 + \mathrm{mod}\left(\left(\dfrac{(\max(k_1, k_2, k_3, k_4, k_5, k_6)\times t_1)}{(\min(k_1, k_2, k_3, k_4, k_5, k_6)\times t_2)}\right)\times 10^{14}, 2.95\right) \\ r_2 = 1.05 + \mathrm{mod}\left(\left(\dfrac{(\max(k_7, k_8, k_9, k_{10}, k_{11}, k_{12})\times t_3)}{(\min(k_7, k_8, k_9, k_{10}, k_{11}, k_{12})\times t_4)}\right)\times 10^{14}, 2.95\right) \end{cases}$$

where, $k_i$, i=1, 2, . . . 32 is the i-th binary number of K, and $r_0$, $r_1$ and $r_2$ are the parameter values of the Hybrid mapping, the TLT mapping and the TST mapping respectively.

$$\begin{cases} a = 1.0 \Big/ \left(1 + e^{\frac{1}{256}\times(-t_5\times(k_{13}\oplus k_{14}\oplus k_{15}))}\right) \\ b = 5.0 \Big/ \left(1 + e^{\frac{1}{256}\times(-t_6\times(k_{16}\oplus k_{17}\oplus k_{18}))}\right) \\ c = \dfrac{1}{2}\times\left(1.5\Big/\left(1 + e^{\frac{1}{256}\times(-t_7\times(k_{19}\oplus k_{20}\oplus k_{21}))}\right) + 2.8\Big/\left(1 + e^{\frac{1}{256}\times(-t_8\times(k_{22}\oplus k_{23}\oplus k_{24}))}\right)\right) \end{cases}$$

where, a, b, c are the parameter values of the ISEL mapping.

$$\begin{cases} Z_1 = \begin{bmatrix} t_1\times k_{25} & t_3\times k_{26} \\ t_5\times k_{27} & t_7\times k_{28} \end{bmatrix} \\ Z_2 = \begin{bmatrix} t_2\times k_{29} & t_4\times k_{30} \\ t_6\times k_{31} & t_8\times k_{32} \end{bmatrix} \end{cases}$$

The two matrices $Z_1$ and $Z_2$ are constructed according to the above formula, and then the Kronecker product of the two matrices is calculated to obtain $Z_3$.

$$\begin{cases} x_0 = \mathrm{mod}\left((Z_3(1)+Z_3(2)-\lfloor Z_3(1)+Z_3(2)\rfloor)\times 10^{14}, 1\right) \\ x_{00} = \mathrm{mod}\left((Z_3(3)+Z_3(4)-\lfloor Z_3(3)+Z_3(4)\rfloor)\times 10^{14}, 1\right) \\ y_{00} = \mathrm{mod}\left((Z_3(1)+Z_3(3)-\lfloor Z_3(1)+Z_3(3)\rfloor)\times 10^{14}, 1\right) \\ v_0 = \mathrm{mod}\left((Z_3(2)+Z_3(4)-\lfloor Z_3(2)+Z_3(4)\rfloor)\times 10^{14}, 1\right) \end{cases}$$

where, $\lfloor \cdot \rfloor$ presents downward rounding, $Z_3$ (i), i=1, 2, 3, 4 represents the i-th element of the matrix $Z_3$, and $x_0$, $x_{00}$, $y_{00}$, $v_0$ are the initial values of the Hybrid mapping, the TLT mapping, the TSL mapping, and ISEL mapping respectively.

Step 2. obtaining subsampling rates of original coefficient matrices at all levels by using multi-scale block compressed sensing theory through a total target sampling rate of a plaintext image.

Step 3. substituting the parameters and initial values of the one-dimensional chaotic mapping into a corresponding chaotic system to generate chaotic sequences, transforming the chaotic sequences into a matrix form, and obtaining corresponding orthogonal basis matrices; and extracting some elements of the orthogonal basis matrices as the measurement matrices according to the subsampling rates.

For example, the parameter $r_2$ and initial value $y_{00}$ of the chaotic system generated in step 1 are substituted into the TST mapping, which iterates $t+n_1\times n_i$ times, $r_1$ and $x_{00}$ are substituted into the TLT mapping, which iterates $t+n_2\times n_2$ times, and $r_0$ and $x_0$ are substituted into the Hybrid mapping, which iterates $t+n_3\times n_3$ times, where $n_1$, $n_2$, and $n_3$ are determined by the block size given in advance. Every 2000 iterations, the sine value of the initial state is multiplied by a tiny coefficient to disturb the initial state value of the next iteration, and the corresponding chaotic sequences $X_1$, $X_2$, $X_3$ are obtained by discarding the first T elements. Where, $X_1$ is a sequence of a length $n_1\times n_1$, $X_2$ is a sequence of a length $n_2\times n_2$, and $X_3$ is a sequence of a length $n_3\times n_3$. In order to strengthen the randomness of the chaotic sequences, the generated chaotic sequences are further processed. That is, the sequence is multiplied by an interference coefficient α, and then an interference coefficient β is added to obtain the sequences $X_1'$, $X_2'$, $X_3'$, where, α=−2 and β=1. The processed chaotic sequences $X_1'$, $X_2'$, $X_3'$ are transformed into a matrix form to obtain $X_1''$, $X_2''$, $X_3''$. Where, $X_1''$ is a $n_1\times n_1$ matrix, $X_2''$ is a $n_2\times n_2$ matrix, and $X_3''$ is a $n_3\times n_3$ matrix. Then, the orthogonal basis matrices $\Phi_1$, $\Phi_2$, $\Phi_3$ corresponding to $X_1''$, $X_2''$, $X_3''$ are used as redundant measurement matrices. The row dimensions $n_i$, i=1, 2, 3 of the redundant measurement matrices are multiplied by the corresponding sampling rates to obtain new row dimensions $m_i$, I=1, 2, 3, and then the first $m_i$ rows of the redundant measurement matrices are extracted as the formal measurement matrices $\Phi_1'$, $\Phi_2'$, $\Phi_3'$ respectively.

Step 4. performing three-level discrete wavelet transform on the plaintext image to obtain the original coefficient matrices at all levels, and blocking the original coefficient matrices at all levels to construct new coefficient matrixes at all levels.

Figure 2:
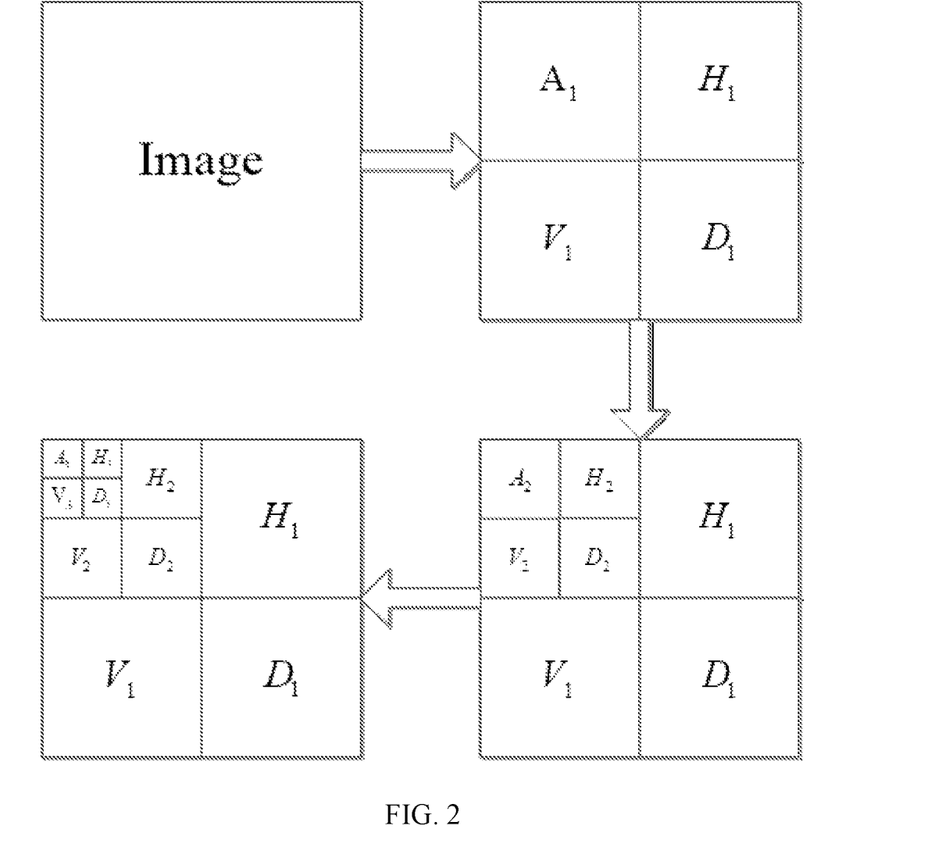
FIG. 2 is a schematic diagram of three-level wavelet decomposition of the present disclosure.

For example, as shown in FIG. 2, new coefficient matrices at all levels are constructed as a low-frequency coefficient matrix $A_3$ and nine high-frequency coefficient matrices $H_i$, $V_i$, $D_i$, i=1, 2, 3 in horizontal, vertical and diagonal directions.

Step 5. using the chaotic sequences to generate index sequences, and scrambling the corresponding coefficient matrices at all levels as blocks;

For example, the array block_size with a length being 3 is given, and the numerical value of the element represents the block size. Third-level wavelet decomposition coefficient matrices $H_3$, $V_3$, $D_3$ are divided into block_size$_3$×block_size$_3$ blocks, second-level wavelet decomposition matrices $H_2$, $V_2$, $D_2$ are divided into block_size$_2$×block_size$_2$ blocks, first-level wavelet decomposition coefficient matrices $H_1$, $V_1$, $D_1$ are divided into block_size$_1$×block_size$_1$ blocks, and then each block matrix is expanded into column vectors after blocking. Finally, the corresponding column vectors are merged in turn to form nine new coefficient matrices $NH_3$, $NV_3$, $ND_3$, $NH_2$, $NV_2$, $ND_2$, $NH_1$, $NV_1$, $ND_1$.

The three chaotic sequences $X_1'$, $X_2'$ and $X_3'$ generated in step 3 are sorted in ascending order to obtain the corresponding index sequences $Ind_1$, $Ind_2$ and $Ind_3$. Third-level wavelet decomposition coefficient matrices $A_3$, $NH_3$, $NV_3$, $ND_3$ are scrambled by $Ind_3$ to obtain $A_3'$, $H_3'$, $V_3'$, $D_3'$, second-level wavelet decomposition coefficient matrices $NH_2$, $NV_2$, $ND_2$ are scrambled by $Ind_2$ to obtain $H_2'$, $V_2'$, $D_2'$, and first-level wavelet decomposition coefficient matrices $NH_1$, $NV_1$, $ND_1$ are scrambled by $Ind_1$ to obtain $H_1'$, $V_1'$, $D_1'$. Taking $A_3$ as an example, letting the matrix $A_3$ be an m×n matrix, expanding the matrix $A_3$ into a sequence with a length being m×n, wherein i is the index of the i-th element in the sequence. Wherein, $A_3'$ is the sequence after $A_3$ is scrambled.

$$A_3'(Ind_3(m \times n - i + 1)) = A_3(Ind_3(i))$$

Step 6. using the measurement matrices to measure the coefficient matrices at all levels.

For example, the coefficient matrix $A_3'$ remains unchanged, and the coefficient matrices $H_3'$, $V_3'$, $D_3'$ are measured with $\Delta_3'$ to obtain measured value matrices $H_3''$, $V_3''$, $D_3''$, the coefficient matrices $H_2'$, $V_2'$, $D_2'$ are measured with $\Phi_2'$ to obtain measured value matrices $H_2''$, $V_2''$, $D_2''$; and the coefficient matrices $H_1'$, $V_1'$, $D_1'$ are measured with $\Phi_1'$ to obtain measured value matrices $H_1''$, $V_1''$, $D_1''$.

Step 7. retaining low-frequency coefficient matrices, merging measured non-low frequency coefficient matrices at all levels to construct a matrix T, performing micro-processing on the matrix T to obtain a to-be-measured matrix NT, and respectively generating the row-state transition probability matrix and the column-state transition probability matrix according to the to-be-measured matrix NT;

$$T = \begin{pmatrix} H_1'' & V_1'' & D_1'' \\ H_2'' & V_2'' & D_2'' \\ H_3'' & V_3'' & D_3'' \end{pmatrix}$$

In order to enhance the randomness, the to-be-measured matrix T is microprocessed according to the information $l_0$, $l_1$, $L_0$, $L_1$ obtained in step 1 to obtain the matrix NT.

$$\begin{cases} NT = -T, l_0 > l_1 \\ NT = T - 0.5, L_0 > L_1 \\ NT = T + 0.5, L_0 < L_1 \end{cases}$$

The row-state transition probability matrix and the column-state transition probability matrix are constructed by merging the element information of the matrix NT.

Step 8. performing SVD decomposition on the low-frequency coefficient matrices to obtain submatrices, and quantizing the elements in the submatrices and the non-low frequency coefficient matrices at all levels to a preset interval.

For example, the maximum value and the minimum value of the nine coefficient matrices $H_i''$, $V_i''$, $D_i''$, i=1, 2, 3 after wavelet decomposition at all levels are obtained respectively, and the coefficient matrices are quantized to an interval [0, 255]. After the quantification of the nine coefficient matrices $H_i''$, $V_i''$, $D_i''$, i=1, 2, 3 is completed, the nine corresponding coefficient matrices $H_i'''$, $V_i'''$, $D_i'''$, i=1, 2, 3 are obtained. SVD decomposition is performed on the low-frequency matrix $A_3'$ to obtain three submatrices with the same dimensions u, s, and vt, then the maximum and minimum values of the three submatrices are obtained respectively, the three sub-matrices u, s, and vt are quantized to the interval [0, 255], and the corresponding matrices U, S, VT are finally obtained.

Step 9. generating index values according to the information of the chaotic sequences and determining merging rules by the index values, firstly mering the non-low frequency coefficient matrices at all levels according to the merging rules to obtain an overall matrix, and then inserting the submatrices into different positions of the overall matrix.

For example, the coefficients in the same direction are merged into one group, and $H_1'''$, $H_2'''$, $H_3'''$ are grouped into one group, which is recorded as the first group. $V_1'''$, $V_2'''$, $V_3'''$ are grouped into one group, which is recorded as the second group. $D_1'''$, $D_2'''$, $D_3'''$ are grouped into one group, which is recorded as the third group. The three chaotic sequences $X_1'$, $X_2'$, $X_3'$ generated in step 3 are used for obtaining the index values.

$$\begin{cases} Lind_1 = (X_1'(n_1 \times n_1) + X_2'(n_2 \times n_2) + X_3'(n_3 \times n_3))/3 \\ Lind_1' = \text{floor}(\text{mod}(\text{abs}(Lind_1) \times 10^8, 6)) + 1 \\ Lind_2 = (X_1'(n_1 \times n_1 - 1) + X_2'(n_2 \times n_2 - 1) + X_3'(n_3 \times n_3 - 1))/3 \\ Lind_2' = \text{floor}(\text{mod}(\text{abs}(Lind_2) \times 10^8, 6)) + 1 \\ Lind_3 = (X_1'(n_1 \times n_1 - 2) + X_2'(n_2 \times n_2 - 2) + X_3'(n_3 \times n_3 - 2))/3 \\ Lind_3' = \text{floor}(\text{mod}(\text{abs}(Lind_3) \times 10^8, 6)) + 1 \end{cases}$$

That is, the index value $Lind_1'$ of the first group is determined by the last element of $X_1'$, $X_2'$, $X_3'$, the index value $Lind_2'$ of the second group is determined by the penultimate element of $X_1'$, $X_2'$, $X_3'$, and the index value $Lind_3'$ of the third group is determined by the antepenult element of $X_1'$, $X_2'$, $X_3'$. At the same time, the three index values are mapped to an interval [1,6], representing that there are six possible sorting orders for each group.

$$\begin{cases} \begin{pmatrix} Y_{11} \\ Y_{12} \\ Y_{13} \end{pmatrix} = \begin{pmatrix} H_3''' \\ H_2''' \\ H_1''' \end{pmatrix}, \begin{pmatrix} Y_{21} \\ Y_{22} \\ Y_{23} \end{pmatrix} = \begin{pmatrix} V_3''' \\ V_2''' \\ V_1''' \end{pmatrix}, \begin{pmatrix} Y_{31} \\ Y_{32} \\ Y_{33} \end{pmatrix} = \begin{pmatrix} D_3''' \\ D_2''' \\ D_1''' \end{pmatrix} \\ \begin{pmatrix} Y_{11} \\ Y_{12} \\ Y_{13} \end{pmatrix} = \begin{pmatrix} H_3''' \\ H_1''' \\ H_2''' \end{pmatrix}, \begin{pmatrix} Y_{21} \\ Y_{22} \\ Y_{23} \end{pmatrix} = \begin{pmatrix} V_3''' \\ V_1''' \\ V_2''' \end{pmatrix}, \begin{pmatrix} Y_{31} \\ Y_{32} \\ Y_{33} \end{pmatrix} = \begin{pmatrix} D_3''' \\ D_1''' \\ D_2''' \end{pmatrix} \\ \begin{pmatrix} Y_{11} \\ Y_{12} \\ Y_{13} \end{pmatrix} = \begin{pmatrix} H_2''' \\ H_3''' \\ H_1''' \end{pmatrix}, \begin{pmatrix} Y_{21} \\ Y_{22} \\ Y_{23} \end{pmatrix} = \begin{pmatrix} V_2''' \\ V_3''' \\ V_1''' \end{pmatrix}, \begin{pmatrix} Y_{31} \\ Y_{32} \\ Y_{33} \end{pmatrix} = \begin{pmatrix} D_2''' \\ D_3''' \\ D_1''' \end{pmatrix} \\ \begin{pmatrix} Y_{11} \\ Y_{12} \\ Y_{13} \end{pmatrix} = \begin{pmatrix} H_2''' \\ H_1''' \\ H_3''' \end{pmatrix}, \begin{pmatrix} Y_{21} \\ Y_{22} \\ Y_{23} \end{pmatrix} = \begin{pmatrix} V_2''' \\ V_1''' \\ V_3''' \end{pmatrix}, \begin{pmatrix} Y_{31} \\ Y_{32} \\ Y_{33} \end{pmatrix} = \begin{pmatrix} D_2''' \\ D_1''' \\ D_3''' \end{pmatrix} \\ \begin{pmatrix} Y_{11} \\ Y_{12} \\ Y_{13} \end{pmatrix} = \begin{pmatrix} H_1''' \\ H_3''' \\ H_2''' \end{pmatrix}, \begin{pmatrix} Y_{21} \\ Y_{22} \\ Y_{23} \end{pmatrix} = \begin{pmatrix} V_1''' \\ V_3''' \\ V_2''' \end{pmatrix}, \begin{pmatrix} Y_{31} \\ Y_{32} \\ Y_{33} \end{pmatrix} = \begin{pmatrix} D_1''' \\ D_3''' \\ D_2''' \end{pmatrix} \\ \begin{pmatrix} Y_{11} \\ Y_{12} \\ Y_{13} \end{pmatrix} = \begin{pmatrix} H_1''' \\ H_2''' \\ H_3''' \end{pmatrix}, \begin{pmatrix} Y_{21} \\ Y_{22} \\ Y_{23} \end{pmatrix} = \begin{pmatrix} V_1''' \\ V_2''' \\ V_3''' \end{pmatrix}, \begin{pmatrix} Y_{31} \\ Y_{32} \\ Y_{33} \end{pmatrix} = \begin{pmatrix} D_1''' \\ D_2''' \\ D_3''' \end{pmatrix} \end{cases}$$

where, a first group of sorted matrices are marked as $Y_1$, and three internal block matrices are marked as $Y_{11}$, $Y_{12}$, $Y_{13}$ respectively; a second group of sorted matrices are marked as $Y_2$, and three internal block matrices are marked as $Y_{21}$, $Y_{22}$, $Y_{23}$ respectively; and a third group of sorted matrices are marked as $Y_3$, and three internal block matrices are marked as $Y_{31}$, $Y_{32}$, $Y_{33}$ respectively.

The quantized matrices U, S, VT are inserted into the first round of merged matrices respectively. That is, the matrix U is inserted into the first group $Y_1$, the matrix S is inserted into the second group $Y_2$, and the matrix VT is inserted into the third group $Y_3$. The three chaotic sequences $X_1'$, $X_2'$, $X_3'$ generated in step 3 are used for obtaining the index value.

$$\begin{cases} Hind_1 = (X_1'(1) + X_2'(1) + X_3'(1))/3 \\ Hind_2 = (X_1'(2) + X_2'(2) + X_3'(2))/3 \\ Hind_3 = (X_1'(3) + X_2'(3) + X_3'(3))/3 \\ Hind_1' = \text{floor}(\text{mod}(\text{abs}(Hind_1) \times 10^8, 4)) + 1 \\ Hind_2' = \text{floor}(\text{mod}(\text{abs}(Hind_2) \times 10^8, 4)) + 1 \\ Hind_3' = \text{floor}(\text{mod}(\text{abs}(Hind_3) \times 10^8, 4)) + 1 \end{cases}$$

That is, the index value Hind1' of the first group is determined by the first element of $X_1'$, $X_2'$, $X_3'$, the index value Hind1' of the second group is determined by the second element of $X_1'$, $X_2'$, $X_3'$, and the index value Hind1' of the third group is determined by the third element of $X_1'$, $X_2'$, $X_3'$. At the same time, the three index values are mapped to an interval [1,4], representing that the three matrices U, S, and VT have four insertion positions respectively, that is, the top of each matrix group, between the two adjacent block matrices in the group, and the bottom of the matrix group. The results are as follows:

$$\begin{cases} Y_1' = \begin{pmatrix} U \\ Y_{11} \\ Y_{12} \\ Y_{13} \end{pmatrix}, Y_2' = \begin{pmatrix} S \\ Y_{21} \\ Y_{22} \\ Y_{23} \end{pmatrix}, Y_3' = \begin{pmatrix} VT \\ Y_{31} \\ Y_{32} \\ Y_{33} \end{pmatrix} \\ Y_1' = \begin{pmatrix} Y_{11} \\ U \\ Y_{12} \\ Y_{13} \end{pmatrix}, Y_2' = \begin{pmatrix} Y_{21} \\ S \\ Y_{22} \\ Y_{23} \end{pmatrix}, Y_3' = \begin{pmatrix} Y_{31} \\ VT \\ Y_{32} \\ Y_{33} \end{pmatrix} \\ Y_1' = \begin{pmatrix} Y_{11} \\ Y_{12} \\ U \\ Y_{13} \end{pmatrix}, Y_2' = \begin{pmatrix} Y_{21} \\ Y_{22} \\ S \\ Y_{23} \end{pmatrix}, Y_3' = \begin{pmatrix} Y_{31} \\ Y_{32} \\ VT \\ Y_{33} \end{pmatrix} \\ Y_1' = \begin{pmatrix} Y_{11} \\ Y_{12} \\ Y_{13} \\ U \end{pmatrix}, Y_2' = \begin{pmatrix} Y_{21} \\ Y_{22} \\ Y_{23} \\ S \end{pmatrix}, Y_3' = \begin{pmatrix} Y_{31} \\ Y_{32} \\ Y_{33} \\ VT \end{pmatrix} \end{cases}$$

Where, a first group of merged matrices are marked as $Y_1'$, a second group of merged matrices are marked as $Y_2'$, and a third group of merged matrices are marked as $Y_3'$. The three matrices $Y_1'$, $Y_2'$ and $Y_3'$ are merged, and the merged matrix is recorded as a matrix T'.

$$T'=(Y_1'Y_2'Y_3')$$

Step 10. adjusting the dimension of the overall matrix, acquiring the element information of the overall matrix, and generating control parameters for secondary scrambling.

For example, assuming that the dimension of the merged matrix is m×n, two factors $m_1$ and $n_1$ of m×n are found, so that $m_1 \times n_1 = M \times n$, meanwhile, $|m_1-n_1|$ is the minimum, and then the dimension of the matrix is adjusted to $m_1 \times n_1$. Then the matrix information is obtained as follows.

$$\begin{cases} \text{Max} = \max(T') \\ \text{Min} = \min(T') \\ d_1 = \text{floor}(\text{mean}(T')) \\ d_2 = \text{ceil}((\max + \min)/2) \\ d_1' = \text{mod}(d_1, 10) \\ d_2' = \text{mod}(d_2, 10) \\ d_{12} = \max(d_1', d_2') \end{cases}$$

where, Max is the maximum value of the matrix T', Min is the minimum value of the matrix T', $d_1$ is the maximum integer less than or equal to the average value of elements in the matrix T', $d_2$ is the minimum integer greater than or equal to the average value of Max and Min, $d_1'$ is the remainder of $d_1$ divided by 10, $d_2'$ is the remainder of $d_2$ divided by 10, and $d_{12}$ is the larger of d1' and d2'.

Step 11. scrambling the merged overall matrix according to the row-state transition probability matrix and the column-state transition probability matrix, and simultaneously setting corresponding flag bits;

For example, the parameters a, b, c and the initial value $v_0$ generated in step 1 are substituted into the ISEL mapping, which iterates $t+(d_{12}+1) \times m_1 \times n_1$, and every 2000 iterations, the sine value of the initial state is multiplied by the tiny coefficient to disturb the initial state value of the next iteration. One chaotic sequence V is generated by discarding the first t elements. In order to strengthen the randomness, the sequence V is further processed. That is, the sequence is multiplied by the interference coefficient α, and then the interference coefficient β is added to obtain the sequence V', where, α=−4, and β=1. Then, the four subsequences $V_1$, $V_2$, $V_3$ and $V_4$ are generated according to the chaotic sequence V'.

$$\begin{cases} V_1 = 10 \times V' - \text{round}(10 \times V') \\ V_2 = 10^2 \times V' - \text{round}(10^2 \times V') \\ V_3 = 10^3 \times V' - \text{round}(10^3 \times V') \\ V_4 = 10^4 \times V' - \text{round}(10^4 \times V') \end{cases}$$

where, round is a rounding function.

According to $V_1$, $V_2$, $V_3$ and $V_4$, control parameters for the scrambling process are generated, and the calculation process is as follows.

$$\begin{cases} w_1 = \text{fix }(\text{mod}(V_1(m'_1 + n'_1) + 1, 5)) \\ w_2 = \text{fix }(\text{mod}(V_2(\text{round }(m'_1/2 + n'_1/2) + 2 \times 10^2, 5^2)) \\ w_3 = \text{fix }(\text{mod}(V_3(\text{abs}(\text{round }(m'_1/3 + n'_1/3) + 3)) \times 10^3, 5^3)) \\ w_4 = \text{fix }(\text{mod}(V_4(\text{abs}(\text{round }(m'_1/4 + n'_1/4) + 4)) \times 10^4, 5^4)) \end{cases}$$

where, $w_1$-$w_4$ are used as control parameters for subsequent shift operation, and fix is a rounding function to zero. Where, $m_1'$ is a maximum prime factor of a matrix row dimension $m_1$, and $n_1'$ is a maximum prime factor of a matrix column dimension $n_1$.

Step 12. performing independent diffusion on the elements of the overall matrix by using one of the chaotic sequences, and performing global diffusion on the elements of the overall matrix by using the other chaotic sequences to obtain the final encrypted image.

For example, the column vectors are scrambled according to the row-state transition probability matrix generated in step 7. If the column of the selected number corresponds to a positive odd number, the moving digit of the matrix element is $w_1$; if the column of the selected number corresponds to a negative odd number, the moving digit of the matrix element is $w_3$; if the column of the selected number corresponds to a positive even number, the moving digit of the matrix element is $w_2$; and if the column of the selected number corresponds to a negative even number, the moving digit of the matrix element is $w_4$. The scrambled matrix is set to T". The initial value of the state transition flag bit matrix is set to 0. If the element in the corresponding position is shifted, the flag bit of the corresponding position changes from 0 to 1.

The row vectors are scrambled according to the column-state transition probability matrix generated in step 7, and the rules are the same as those in the above steps. The scrambled matrix is set to T'". Similarly, the initial flag bit matrix is set, and if the corresponding position is shifted, the flag bit of the corresponding position changes from 0 to 1.

The chaotic sequence V' generated in step 11 is quantized to an interval [0,255] to obtain the sequence V". The $d_1'$ and $d_2'$ obtained in step 10 are used as samplings interval of the chaotic sequences, the sequence V1' is obtained by sampling V" at the interval of $d_1'$, and the sequence $V_2'$ is obtained by sampling V" at an interval of $d_2'$. The position of the last element of the sequence $V_2'$ is taken as the starting position, and the continuous $m_1 \times n_1$ data are taken backward from the sequence V", and are recorded as a sequence $V_0$. The image matrix T'" is XOR with the sequence $V_0$ to obtain the matrix T"". T"" is recorded as the matrix A.

The sequence $V_1'$ is used for performing forward additive modulo operation on the matrix A to obtain a matrix B, and then the previous element of each element in the matrix B is used for performing cyclic left shift operation to obtain B'; $V_2'$ is used for performing backward additive modulo operation on the matrix B' to obtain a matrix C, and then the latter element of each element in the matrix C is used for performing cyclic left shift operation to obtain C'. Thus, the final encrypted image is obtained.

The present disclosure discloses an image encryption method based on multi-scale compressed sensing and a Markov model. According to the difference in information carried by low-frequency coefficients and high-frequency coefficients of an image, different sampling rates are set for the low-frequency coefficients and the high-frequency coefficients of the image, which can effectively improve the reconstruction quality of a decrypted image. In addition, by merging the chaotic system and the Markov model, the encryption process is completed by firstly scrambling in the coefficient matrices of the image, then scrambling between the coefficient matrices of the image, and finally performing independent diffusion and global diffusion.

What is claimed is:

1. An image encryption method based on multi-scale compressed sensing and a Markov model, comprising:
   generating parameters and initial values of one-dimensional chaotic mapping according to plaintext image information;
   obtaining subsampling rates of original coefficient matrices at all levels by using multi-scale block compressed sensing theory through a total target sampling rate of a plaintext image;
   substituting the parameters and initial values of the one-dimensional chaotic mapping into a corresponding chaotic system to generate chaotic sequences, transforming the chaotic sequences into a matrix form, and obtaining corresponding orthogonal basis matrices, and extracting some elements of the orthogonal basis matrices as measurement matrices according to the subsampling rates;
   performing three-level discrete wavelet transform on the plaintext image to obtain the original coefficient matrices at all levels, and blocking the original coefficient matrices at all levels to construct new coefficient matrixes at all levels;
   using the chaotic sequences to generate index sequences, and scrambling the corresponding coefficient matrices at all levels as blocks;
   using the measurement matrices to measure the coefficient matrices at all levels;
   retaining low-frequency coefficient matrices, merging measured non-low frequency coefficient matrices at all levels to construct a matrix T, performing micro-processing on the matrix T to obtain a to-be-measured matrix NT, and respectively generating a row-state transition probability matrix and a column-state transition probability matrix according to the to-be-measured matrix NT;
   performing SVD decomposition on the low-frequency coefficient matrices to obtain submatrices, and quantizing the elements in the submatrices and the non-low frequency coefficient matrices at all levels to a preset interval;
   generating index values according to the information of the chaotic sequences and determining merging rules by the index values, firstly mering the non-low frequency coefficient matrices at all levels according to the merging rules to obtain an overall matrix, and then inserting the submatrices into different positions of the overall matrix;

adjusting the dimension of the overall matrix, acquiring the element information of the overall matrix, and generating control parameters for secondary scrambling;

scrambling the merged overall matrix according to the row-state transition probability matrix and the column-state transition probability matrix, and simultaneously setting corresponding flag bits; and performing independent diffusion of elements on the overall matrix by using one of the chaotic sequences, and performing global diffusion on elements of the overall matrix by using the other chaotic sequences to obtain a final encrypted image.

2. The image encryption method based on multi-scale compressed sensing and a Markov model of claim 1, wherein a specific method of generating parameters and initial values of one-dimensional chaotic mapping according to plaintext image information is as follows:

$$r_0 = \begin{cases} r_{end} - \dfrac{\mathrm{mod}\left(\left(\dfrac{l_0}{L_0} + \dfrac{l_1}{L_1}\right) \times r_{end} \times 10, 1\right)}{10}, \left(\dfrac{l_0}{L_0} + \dfrac{l_1}{L_1}\right) \times r_{end} \times 10 > r_{end} \\ \left(\dfrac{l_0}{L_0} + \dfrac{l_1}{L_1}\right) \times r_{end} \times 10, \left(\dfrac{l_0}{L_0} + \dfrac{l_1}{L_1}\right) \times r_{end} \times 10 \leq r_{end} \end{cases}$$

where, $L_0$ and $L_1$ are the numbers of 0 and 1 in a hash value K of the plaintext image respectively, $l_0$ and $l_1$ are a length of a longest continuous 0 sequence and a length of a longest continuous 1 sequence respectively, $r_{end}$ is a right endpoint of a chaotic interval, and $r_0$ is a certain value of the chaotic interval;

$$\begin{cases} r_1 = r_{start} + \mathrm{mod}\left(\left(\dfrac{(\max(k_1, k_2, k_3, k_4, k_5, k_6) \times t_1)}{(\min(k_1, k_2, k_3, k_4, k_5, k_6) \times t_2)}\right) \times 10^{14}, r_{end} - r_{start}\right) \\ r_2 = r_{start} + \mathrm{mod}\left(\left(\dfrac{(\max(k_7, k_8, k_9, k_{10}, k_{11}, k_{12}) \times t_3)}{(\min(k_7, k_8, k_9, k_{10}, k_{11}, k_{12}) \times t_4)}\right) \times 10^{14}, r_{end} - r_{start}\right) \end{cases}$$

where, $k_i$, $i=1, 2, \ldots, 12$ is the i-th binary number of K, $t_1$-$t_4$ is an external key, $r_{start}$ is a left endpoint of the chaotic interval, $r_{end}$ is the right endpoint of the chaotic interval, $r_1$ and $r_2$ are some values of the chaotic interval;

$$\begin{cases} a = \dfrac{r_{end}}{\left(1 + e^{\frac{1}{256} \times (-t_5 \times (k_{13} \oplus k_{14} \oplus k_{15}))}\right)} \\ b = \dfrac{r_{end}}{\left(1 + e^{\frac{1}{256} \times (-t_6 \times (k_{16} \oplus k_{17} \oplus k_{18}))}\right)} \\ c = \dfrac{1}{2} \times \left(\dfrac{r_{start}}{\left(1 + e^{\frac{1}{256} \times (-t_7 \times (k_{19} \oplus k_{20} \oplus k_{21}))}\right)} + \dfrac{r_{end}}{\left(1 + e^{\frac{1}{256} \times (-t_8 \times (k_{22} \oplus k_{23} \oplus k_{24}))}\right)}\right) \end{cases}$$

where, $k_i$, $i=13, 14, \ldots, 24$ is the i-th binary number of K, $t_5$-$t_8$ is an external key, $r_{start}$ is the left endpoint of the chaotic interval, $r_{end}$ is the right endpoint of the chaotic interval, and a, b and c are some values of the chaotic interval;

$$\begin{cases} Z_1 = \begin{bmatrix} t_1 \times k_{25} & t_3 \times k_{26} \\ t_5 \times k_{27} & t_7 \times k_{28} \end{bmatrix} \\ Z_2 = \begin{bmatrix} t_2 \times k_{29} & t_4 \times k_{30} \\ t_6 \times k_{31} & t_8 \times k_{32} \end{bmatrix} \end{cases}$$

where, $k_i$, $i=25, 14, \ldots, 32$ is the i-th binary number of K, $t_1$-$t_8$ is an external key, and $Z_1$ and $Z_2$ are transition matrices;

$$\begin{cases} x_0 = \mathrm{mod}((Z_3(1) + Z_3(2) - \lfloor Z_3(1) + Z_3(2) \rfloor) \times 10^{14}, 1) \\ x_{00} = \mathrm{mod}((Z_3(3) + Z_3(4) - \lfloor Z_3(3) + Z_3(4) \rfloor) \times 10^{14}, 1) \\ y_{00} = \mathrm{mod}((Z_3(1) + Z_3(3) - \lfloor Z_3(1) + Z_3(3) \rfloor) \times 10^{14}, 1) \\ v_0 = \mathrm{mod}((Z_3(2) + Z_3(4) - \lfloor Z_3(2) + Z_3(4) \rfloor) \times 10^{14}, 1) \end{cases}$$

where, $\lfloor \bullet \rfloor$ presents downward rounding, $Z_3$ is a Kronecker product of transition $Z_1$ and transition $Z_2$, $Z_3$ (i), i=1, 2, 3, 4 represents the i-th element of the matrix $Z_3$, and $x_0$, $x_{00}$, $y_{00}$, $v_0$ are the initial values of the corresponding chaotic mapping, respectively.

3. The image encryption method based on multi-scale compressed sensing and a Markov model of claim 1, wherein a specific method of scrambling the corresponding coefficient matrices at all levels as the blocks comprises:

letting a matrix $A_3$ be an m×n matrix, expanding the matrix $A_3$ into a sequence with a length being m×n, wherein i is the index of the i-th element in the sequence, a scrambling method of which is as follows:

$$A_3'(Ind_3(m \times n - i + 1)) = A_3(Ind_3(i))$$

where, $A_3'$ is a sequence after $A_3$ is scrambled, and $Ind_3$ is an index sequence for scrambling third-level wavelet decomposition coefficient matrices; and similarly, other coefficient matrices $H_i'$, $V_i'$, $D_i'$, i=1, 2, 3 after scrambling are obtained.

4. The image encryption method based on multi-scale compressed sensing and a Markov model of claim 1, wherein a specific method of performing micro-processing on the matrix T to obtain the to-be-measured matrix NT is as follows:

$$T = \begin{pmatrix} H_1'' & V_1'' & D_1'' \\ H_2'' & V_2'' & D_2'' \\ H_3'' & V_3'' & D_3'' \end{pmatrix}$$

where, $H_i''$, $V_i''$, $D_i''$, i=1, 2, 3 are coefficient matrices after $H_i'$, $V_i'$, $D_i'$, i=1, 2, 3 are compressed, and T is a coefficient merging matrix;

$$\begin{cases} NT = -T, l_0 > l_1 \\ NT = T - 0.5, L_0 > L_1 \\ NT = T + 0.5, L_0 < L_1 \end{cases}$$

where, $L_0$ and $L_1$ are the numbers of 0 and 1 in the hash value K of the plaintext image respectively, $l_0$ and $l_1$ are the length of the longest continuous 0 sequence and the length of the longest continuous 1 sequence respectively, and NT is the to-be-measured matrix after processing T.

5. The image encryption method based on multi-scale compressed sensing and a Markov model of claim 1, wherein a specific method of firstly mering the non-low frequency coefficient matrices at all levels according to the merging rules to obtain the overall matrix is as follows:

$$\begin{cases} Lind_1 = (X'_1(n_1 \times n_1) + X'_2(n_2 \times n_2) + X'_3(n_3 \times n_3))/3 \\ Lind'_1 = \text{floor}\left(\text{mod}(\text{abs}(Lind_1) \times 10^8, 6)\right) + 1 \\ Lind_2 = (X'_1(n_1 \times n_1 - 1) + X'_2(n_2 \times n_2 - 1) + X'_3(n_3 \times n_3 - 1))/3 \\ Lind'_2 = \text{floor}\left(\text{mod}(\text{abs}(Lind_2) \times 10^8, 6)\right) + 1 \\ Lind_3 = (X'_1(n_1 \times n_1 - 1) + X'_2(n_2 \times n_2 - 1) + X'_3(n_3 \times n_3 - 1))/3 \\ Lind'_3 = \text{floor}\left(\text{mod}(\text{abs}(Lind_3) \times 10^8, 6)\right) + 1 \end{cases}$$

where, $Lind_i$, i=1, 2, 3 is an index value generated by the chaotic sequence $X_1'$, i=1, 2, 3, $n_i \times n_i$, i=1, 2, 3 is a length of $X_1'$, i=1, 2, 3, and $Lind_1'$, i=1, 2, 3 is a result of mapping $Lind_i$, i=1, 2, 3 to an interval [1, 6];

$$\begin{cases} \begin{pmatrix} Y_{11} \\ Y_{12} \\ Y_{13} \end{pmatrix} = \begin{pmatrix} H'''_3 \\ H'''_2 \\ H'''_1 \end{pmatrix}, \begin{pmatrix} Y_{21} \\ Y_{22} \\ Y_{23} \end{pmatrix} = \begin{pmatrix} V'''_3 \\ V'''_2 \\ V'''_1 \end{pmatrix}, \begin{pmatrix} Y_{31} \\ Y_{32} \\ Y_{33} \end{pmatrix} = \begin{pmatrix} D'''_3 \\ D'''_2 \\ D'''_1 \end{pmatrix} \\ \begin{pmatrix} Y_{11} \\ Y_{12} \\ Y_{13} \end{pmatrix} = \begin{pmatrix} H'''_3 \\ H'''_1 \\ H'''_2 \end{pmatrix}, \begin{pmatrix} Y_{21} \\ Y_{22} \\ Y_{23} \end{pmatrix} = \begin{pmatrix} V'''_3 \\ V'''_1 \\ V'''_2 \end{pmatrix}, \begin{pmatrix} Y_{31} \\ Y_{32} \\ Y_{33} \end{pmatrix} = \begin{pmatrix} D'''_3 \\ D'''_1 \\ D'''_2 \end{pmatrix} \\ \begin{pmatrix} Y_{11} \\ Y_{12} \\ Y_{13} \end{pmatrix} = \begin{pmatrix} H'''_2 \\ H'''_3 \\ H'''_1 \end{pmatrix}, \begin{pmatrix} Y_{21} \\ Y_{22} \\ Y_{23} \end{pmatrix} = \begin{pmatrix} V'''_2 \\ V'''_3 \\ V'''_1 \end{pmatrix}, \begin{pmatrix} Y_{31} \\ Y_{32} \\ Y_{33} \end{pmatrix} = \begin{pmatrix} D'''_2 \\ D'''_3 \\ D'''_1 \end{pmatrix} \\ \begin{pmatrix} Y_{11} \\ Y_{12} \\ Y_{13} \end{pmatrix} = \begin{pmatrix} H'''_2 \\ H'''_1 \\ H'''_3 \end{pmatrix}, \begin{pmatrix} Y_{21} \\ Y_{22} \\ Y_{23} \end{pmatrix} = \begin{pmatrix} V'''_2 \\ V'''_1 \\ V'''_3 \end{pmatrix}, \begin{pmatrix} Y_{31} \\ Y_{32} \\ Y_{33} \end{pmatrix} = \begin{pmatrix} D'''_2 \\ D'''_1 \\ D'''_3 \end{pmatrix} \\ \begin{pmatrix} Y_{11} \\ Y_{12} \\ Y_{13} \end{pmatrix} = \begin{pmatrix} H'''_1 \\ H'''_3 \\ H'''_2 \end{pmatrix}, \begin{pmatrix} Y_{21} \\ Y_{22} \\ Y_{23} \end{pmatrix} = \begin{pmatrix} V'''_1 \\ V'''_3 \\ V'''_2 \end{pmatrix}, \begin{pmatrix} Y_{31} \\ Y_{32} \\ Y_{33} \end{pmatrix} = \begin{pmatrix} D'''_1 \\ D'''_3 \\ D'''_2 \end{pmatrix} \\ \begin{pmatrix} Y_{11} \\ Y_{12} \\ Y_{13} \end{pmatrix} = \begin{pmatrix} H'''_1 \\ H'''_2 \\ H'''_3 \end{pmatrix}, \begin{pmatrix} Y_{21} \\ Y_{22} \\ Y_{23} \end{pmatrix} = \begin{pmatrix} V'''_1 \\ V'''_2 \\ V'''_3 \end{pmatrix}, \begin{pmatrix} Y_{31} \\ Y_{32} \\ Y_{33} \end{pmatrix} = \begin{pmatrix} D'''_1 \\ D'''_2 \\ D'''_3 \end{pmatrix} \end{cases}$$

where, $H_i'''$, $V_i'''$, $D_i'''$, i=1, 2, 3 is a result of quantizing $H_i''$, $V_i''$, $D_i''$, i=1, 2, 3 to [0, 255], a first group of sorted matrices are marked as $Y_1$, three internal block matrices are marked as $Y_{11}$, $Y_{12}$, $Y_{13}$ respectively, and a sorting order is determined by $Lind_1'$; a second group of sorted matrices are marked as $Y_2$, three internal block matrices are marked as $Y_{21}$, $Y_{22}$, $Y_{23}$, and a sorting order is determined by $Lind_2'$; and a third group of sorted matrices are marked as $Y_3$, three internal block matrices are marked as $Y_{31}$, $Y_{32}$, $Y_{33}$, and a sorting order is determined by $Lind_3'$ D.

6. The image encryption method based on multi-scale compressed sensing and a Markov model of claim 1, wherein a specific method of inserting the submatrices into different positions of the overall matrix is as follows:

$$\begin{cases} Hind_1 = (X'_1(1) + X'_2(1) + X'_3(1))/3 \\ Hind_2 = (X'_1(2) + X'_2(2) + X'_3(2))/3 \\ Hind_3 = (X'_1(3) + X'_2(3) + X'_3(3))/3 \\ Hind'_1 = \text{floor}\left(\text{mod}(\text{abs}(Hind_1) \times 10^8, 4)\right) + 1 \\ Hind'_2 = \text{floor}\left(\text{mod}(\text{abs}(Hind_2) \times 10^8, 4)\right) + 1 \\ Hind'_3 = \text{floor}\left(\text{mod}(\text{abs}(Hind_3) \times 10^8, 4)\right) + 1 \end{cases}$$

where, $Hind_i$, i=1, 2, 3 is an index value generated by the chaotic sequence $X_1'$, i=1, 2, 3, and $Hind_1'$, i=1, 2, 3 is a result of mapping $Hind_i$, i=1, 2, 3 to the interval [1, 4];

$$\begin{cases} Y'_1 = \begin{pmatrix} U \\ Y_{11} \\ Y_{12} \\ Y_{13} \end{pmatrix}, Y'_2 = \begin{pmatrix} S \\ Y_{21} \\ Y_{22} \\ Y_{23} \end{pmatrix}, Y'_3 = \begin{pmatrix} VT \\ Y_{31} \\ Y_{32} \\ Y_{33} \end{pmatrix} \\ Y'_1 = \begin{pmatrix} Y_{11} \\ U \\ Y_{12} \\ Y_{13} \end{pmatrix}, Y'_2 = \begin{pmatrix} Y_{21} \\ S \\ Y_{22} \\ Y_{23} \end{pmatrix}, Y'_3 = \begin{pmatrix} Y_{31} \\ VT \\ Y_{32} \\ Y_{33} \end{pmatrix} \\ Y'_1 = \begin{pmatrix} Y_{11} \\ Y_{12} \\ U \\ Y_{13} \end{pmatrix}, Y'_2 = \begin{pmatrix} Y_{21} \\ Y_{22} \\ S \\ Y_{23} \end{pmatrix}, Y'_3 = \begin{pmatrix} Y_{31} \\ Y_{32} \\ VT \\ Y_{33} \end{pmatrix} \\ Y'_1 = \begin{pmatrix} Y_{11} \\ Y_{12} \\ Y_{13} \\ U \end{pmatrix}, Y'_2 = \begin{pmatrix} Y_{21} \\ Y_{22} \\ Y_{23} \\ S \end{pmatrix}, Y'_3 = \begin{pmatrix} Y_{31} \\ Y_{32} \\ Y_{33} \\ VT \end{pmatrix} \end{cases}$$

$$T' = (Y'_1 \ Y'_2 \ Y'_3)$$

where, $Y_1'$ is a matrix after the first group merging, and the sorting order is determined by $Hind_1'$; $Y_2'$ is a matrix after the second group merging, and the sorting order is determined by $Hind_2'$; $Y_3'$ is a matrix after the third group merging, and the sorting order is determined by $Hind_3'$; T' is a matrix after $Y_1'$, $Y_2'$ and $Y_3'$ are merged; and U, S and VT are three submatrices obtained by SVD decomposition of the low-frequency coefficient matrices at levels.

7. The image encryption method based on multi-scale compressed sensing and a Markov model of claim 1, wherein a specific method of adjusting the dimension of the overall matrix and acquiring the element information of the overall matrix is as follows:

$$\begin{cases} Max = \max(T') \\ Min = \min(T') \\ d_1 = \text{floor}(\text{mean}(T')) \\ d_2 = \text{ceil}((Max + Min)/2) \\ d'_1 = \text{mod}(d_1, 10) \\ d'_2 = \text{mod}(d_2, 10) \\ d'_{12} = \max(d'_1, d'_2) \end{cases}$$

where, Max is the maximum value of the matrix T', Min is the minimum value of the T', $d_1$ is the maximum integer less than or equal to the average value of elements in the T', $d_2$ is the minimum integer greater than or equal to the average value of Max and Min, $d_1'$ is the remainder of $d_1$ divided by 10, $d_2'$ is the remainder of $d_2$ divided by 10, and $d_{12}$ is the larger of d1' and d2'.

8. The image encryption method based on multi-scale compressed sensing and a Markov model of claim 1, wherein a specific method of generating the control parameters for secondary scrambling is as follows:

$$\begin{cases} V_1 = 10 \times V' - \text{round}(10 \times V') \\ V_2 = 10^2 \times V' - \text{round}(10^2 \times V') \\ V_3 = 10^3 \times V' - \text{round}(10^3 \times V') \\ V_4 = 10^4 \times V' - \text{round}(10^4 \times V') \end{cases}$$

where, V' is a generated and processed chaotic sequence, and $V_i$, i=1, 2, 3, 4 is a subsequence generated by V';

$$\begin{cases} w_1 = \text{fix } (\text{mod}(V_1(m_1' + n_1') + 1, 5)) \\ w_2 = \text{fix } (\text{mod}(V_2(\text{round } (m_1'/2 + n_1'/2) + 2 \times 10^2, 5^2)) \\ w_3 = \text{fix } (\text{mod}(V_3(\text{abs}(\text{round } ((m_1'/3 + n_1'/3) + 3))) \times 10^3, 5^3)) \\ w_4 = \text{fix } (\text{mod}(V_4(\text{abs}(\text{round } (m_1'/4 + n_1'/4) + 4)) \times 10^4, 5^4)) \end{cases} \quad 5$$

where, $w_1$-$w_4$ are used as control parameters for subsequent shift operation, and fix is a rounding function to zero; and $m_1'$ is a maximum prime factor of a matrix row dimension $m_1$, and $n_1'$ is a maximum prime factor of a matrix column dimension $n_1$.

\* \* \* \* \*